US006575045B2

(12) United States Patent
Spielman

(10) Patent No.: US 6,575,045 B2
(45) Date of Patent: Jun. 10, 2003

(54) APPARATUS AND METHOD FOR MEASURING ENTHALPY AND FLOW RATE OF A MIXTURE

(75) Inventor: Paul B. Spielman, Ridgecrest, CA (US)

(73) Assignee: Coso Operating Co., LLC, Coso Junction, CA (US)

( * ) Notice: Subject to any disclaimer, the term of this patent is extended or adjusted under 35 U.S.C. 154(b) by 1 day.

(21) Appl. No.: 09/911,046

(22) Filed: Jul. 23, 2001

(65) Prior Publication Data
US 2003/0074982 A1 Apr. 24, 2003

(51) Int. Cl.[7] ................................................. G01F 1/44
(52) U.S. Cl. ..................................................... 73/861.63
(58) Field of Search ........................... 73/861.63, 61.44, 73/112, 861.04, 861.06, 64.41, 599, 61.75; 324/61, 324

(56) References Cited

U.S. PATENT DOCUMENTS

| 3,638,054 | A | * | 1/1972 | Honigsbaum | 310/10 |
| 4,312,234 | A | * | 1/1982 | Rhodes et al. | 73/861.04 |
| 4,574,626 | A | * | 3/1986 | Kaya et al. | 73/112 |
| 4,658,208 | A | * | 4/1987 | Lee et al. | 324/717 |
| 4,836,146 | A | * | 6/1989 | Russell et al. | 122/379 |
| 4,975,645 | A | * | 12/1990 | Lucas | 324/324 |
| 5,235,238 | A | * | 8/1993 | Nomura et al. | 403/163 |
| 5,637,934 | A | * | 6/1997 | Fabris | 310/11 |
| 5,503,004 | A | | 11/2000 | Agar | 73/61.44 |
| 6,359,438 | B1 | * | 3/2002 | Bittar | 324/369 |
| 6,401,538 | B1 | * | 6/2002 | Han et al. | 73/599 |
| 6,459,995 | B1 | * | 10/2002 | Collister | 702/23 |
| 6,467,358 | B1 | * | 10/2002 | Nishi et al. | 73/861.04 |

* cited by examiner

Primary Examiner—Hezron Williams
Assistant Examiner—Jewel V. Thompson
(74) Attorney, Agent, or Firm—Reed Smith LLP

(57) ABSTRACT

A restricted area measurement device, method, and system for measuring a multi-phase mixture are disclosed. The device may include two current electrodes within a restricted area, at least two voltage electrodes within the restricted area, and at least one meter, wherein a multi-phase enthalpy of the multi-phase mixture may be determined by the at least one meter in accordance with a resistivity. The system includes a restricted area, two current electrodes within the restricted area, at least two voltage electrodes within the restricted area, and at least one measuring device, wherein a multi-phase enthalpy of the multi-phase mixture is determined by the at least one measuring device in accordance with a resistivity. The method includes exciting a first electrical current between two current electrodes within the restricted area, measuring a voltage between at least two voltage electrodes within the restricted area, and measuring a multi-phase enthalpy of the multi-phase mixture according to a resistivity.

103 Claims, 1 Drawing Sheet

VENTURI NOZZLE-RESISTIVITY METER
FOR FLOW AND VOLUME FRACTION MEASUREMENT.

PIPELINE RESISTIVITY MEASUREMENT

VENTURI NOZZLE-RESISTIVITY METER
FOR FLOW AND VOLUME FRACTION MEASUREMENT.

APPARATUS AND METHOD FOR MEASURING ENTHALPY AND FLOW RATE OF A MIXTURE

CROSS REFERENCE TO RELATED APPLICATIONS

Not Applicable.

BACKGROUND OF THE INVENTION

1. Field of the Invention

The present invention is directed generally to an apparatus and method for measuring quantities of a mixture and, more particularly, to an apparatus and method for measuring the enthalpy and flow rate of a mixture.

2. Description of the Background

Enthalpy and flow rate are features that may be used to characterize a steam-water mixture flowing in a restricted area, such as a conduit. The change in enthalpy of a system is the heat transferred from surroundings to system in a constant pressure process. The flow rate is the amount of flow of the mixture through a given volume per unit time. It is desirable to measure both the enthalpy and the flow rate of steam-water mixtures flowing in a pipeline, due to the fact that these measures can be used to define the desirable characteristics of the two-phase mixture as to a particular application. For example, two-phase mixtures of steam and water are produced from geothermal wells. This two-phase flow may proceed to a power plant, for example, and, at the power plant, the steam is preferably separated from the water, and the steam proceeds through a turbine in order to generate electricity. Thus, it is highly desirable to measure the characteristic measures of the two phases in order to assess the quality and quantity of electricity generation.

Two-phase flow measurement using a differential pressure in a nozzle is known in the art. However, the accuracy of the flow measurement in existent methodologies is often compromised due to a lack of a continuous measurement of enthalpy. Currently, water and steam fraction are measured periodically by taking a well offline and directing the flow to a test separator. Thus, the enthalpy and flow rate of a well are measured non-continuously, and certain measurements are made off-line.

It is known in the art to make use of devices that measure water fraction in a pipeline using a measurement of the capacitance of the two-phase flow. Certain of these known methods might also be used to measure resistivity of the two-phase flow. However, these known methods make use of delicate instruments that impede the flow, and these delicate instruments are not generally well-suited for the often severe environment of use, such as use in a well field. Further, the use of these delicate instruments is often disadvantageous because the instruments make use of only two electrodes, and the two electrodes not only do not accurately measure flow rate and enthalpy, but may further be rendered inaccurate by mineral deposits.

Therefore, the need exists for an apparatus and method that provides accurate measurement of the flow rate and enthalpy of a two-phase flow, continuously and on-line.

BRIEF SUMMARY OF THE INVENTION

The present invention relates to a measurement device for measuring a multi-phase mixture in a restricted area. The device may include two current electrodes within a restricted area, wherein a first electrical current is excited within the restricted area between said two current electrodes, at least two voltage electrodes within the restricted area, wherein a voltage is present between at least two of said at least two voltage electrodes, and wherein the voltage is produced by the first electrical current, and at least one meter, wherein a multi-phase characteristic of the multi-phase mixture may be determined by the at least one meter in accordance with a resistivity generated by the at least one voltage and the first electrical current, and/or in accordance with a flow rate of the liquid mixture.

The present invention additionally relates to a measurement system for measuring a multi-phase mixture in a restricted area. The system includes a restricted area, two current electrodes within the restricted area, wherein a first electrical current is excited within the restricted area between the two current electrodes, at least two voltage electrodes within the restricted area, wherein a voltage is measured between at least two of the at least two voltage electrodes, and wherein the voltage is produced by the current, at least one measuring device, wherein a multi-phase enthalpy of the multi-phase mixture is determined by the at least one measuring device in accordance with a resistivity generated by the at least one voltage and the first electrical current, and wherein a multi-phase flow rate is determined by the at least one measuring device.

The present invention relates to a method of measuring a multi-phase mixture in a restricted area. The method includes exciting a first electrical current between two current electrodes within the restricted area, measuring a voltage between at least two voltage electrodes within the restricted area, wherein the voltage is produced by the current, and measuring a multi-phase enthalpy of the multi-phase mixture according to a resistivity measure generated by the voltage and the current.

The present invention determines enthalpy of a steam-water mixture flowing in a restricted area by measuring resistivity, and preferably determines flow rate from measurements of pressure. The restricted area preferably includes a nozzle that agitates the flow so that the phases are mixed and evenly dispersed where the resistivity, enthalpy, and/or flow measurements are made. This mixing in the nozzle allows for a measurement of flow rate due to the decrease in pressure in the nozzle, and the mixing improves the resistivity measurement by improving the evenness of a mixture that may include an element of approximately infinite resistivity.

The present invention solves problems experienced in the prior art because it provides an apparatus and method that provides measurement of the flow rate and enthalpy of a two-phase flow, continuously and on-line. Those and other advantages and benefits of the present invention will become apparent from the detailed description of the invention hereinbelow.

BRIEF DESCRIPTION OF THE SEVERAL VIEWS OF THE DRAWING

For the present invention to be clearly understood and readily practiced, the present invention will be described in conjunction with the following figures, wherein like reference numerals designate like elements, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical flow measurement system. Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1:
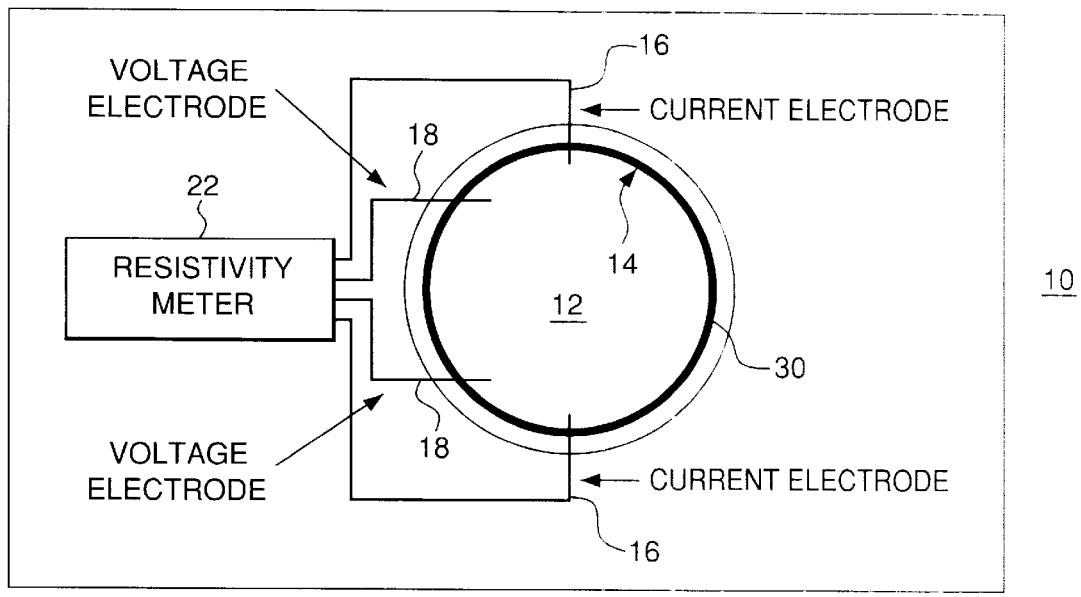
FIG. 1 is a schematic diagram illustrating a restricted area resistivity measurement system.

FIG. 1 is a schematic diagram illustrating a restricted area resistivity measurement system 10. The measurement system 10 includes a restricted area 12, such as a conduit, preferably having an insulated interior coating 14, two current electrodes 16, at least two voltage electrodes 18, and at least one measuring device 22, such as a resistivity meter.

A resistivity measurement is made using the system of FIG. 1 in order to allow continuous measurement of the volume fractions of a multi-phase mixture flowing through a restrictive cross sectional area 12, such as through a pipeline conduit. A resistivity measurement, such as by measuring device 22, may be used to determine, for example, the enthalpy of a steam-water mixture, the oil-water ratios of an emulsion, or the fractions of any multi-phase mixture having a resistivity contrast between the phases.

The enthalpy of a steam-water mixture flowing through a nozzle may be determined from a resistivity measurement in the present invention, as discussed hereinbelow, which resistivity measurement is performed by dividing a known voltage by a known current. Additionally, flow rate may be determined in the present invention from a pressure measurement in the restricted area 12, such as through the use of a differential pressure meter 22, as discussed hereinbelow.

The resistivity of the fluid in the restricted area 12 may be measured by causing a current to flow through two electrodes 16 within the restricted area, such as the current electrodes 16 illustratively shown at the top and bottom of the restricted area 12, and measuring the voltage between at least two points on at least two electrodes 18, such as those illustratively shown located on the side of the pipeline 12 between the current electrodes 16. Although two voltage electrodes 18 are illustratively shown, it will be apparent to those skilled in the art that, in order to provide verification of voltage using multiple measures, or in order to provide redundancy in the case of failure, any number of voltage electrodes 18 may be used in the present-invention. The electrodes 16, 18 used in the present invention may be embedded within the walls 30 of the restricted area 12, or may be partially or completely exposed within the restricted area 12. The embedding of the electrodes 16, 18 advantageously minimizes the damage to the electrodes 16, 18 caused by the flow, or by the characteristics of the mixture flowing, in the restricted area 12, and additionally minimizes the effect of mineral deposits on the electrodes 16, 18.

The interior of the restricted area 12 is preferably insulated to allow the supplied current from the electrodes 16 to flow only through the liquid mixture in the restricted area 12, and not within the walls 30 of the restricted area 12, such as within the walls 30 of the pipeline 12. Current flowing in the walls 30 of the restricted area 12 may cause the appearance of stray voltage due to the conductive characteristics of the restricted area 12, thereby causing the resistivity measurement to be incorrect with respect to the liquid mixture desired to be measured. Resistivity is thus properly measured solely within the liquid mixture, and solely within the volume of the restricted area 12 between the at least two voltage electrodes 18. Additionally, the resistivity measurement is preferably calibrated, and this calibration may be performed by filling the restricted area 12 with a liquid of known resistivity and subsequently making a resistivity measurement of the liquid having known resistivity.

Liquid volume fraction of a liquid may be calculated from the resistivity of a multi-phase mixture, assuming that the resistivity of the multiple phases is different. Thus, because the resistivity of the each phase of a steam-water mixture, for example, is different, the liquid volume fraction can be calculated from the resistivity of a steam-water mixture. Steam is of infinite resistivity, and the resistivity of water depends on the salt content of the water. In this exemplary steam-water phase embodiment, the liquid volume fraction ($V_L$) is ideally equal to the square root of water resistivity ($R_W$) divided by multi-phase mixture resistivity ($R_{TP}$) as measured at the measurement device 22, as given by Equation 1:

$$V_L = \sqrt{\frac{R_W}{R_{TP}}}. \qquad (1)$$

Empirical data collected may indicate that the accuracy of Equation 1 can be improved with adjustment factors A and B, as evidenced by Equation 1a:

$$V_L = A\left(\frac{R_W}{R_{TP}}\right)^{\frac{B}{2}}. \qquad (1a)$$

The resistivity of the liquid ($R_W$) can be measured by filling the restricted area 12 with the liquid, such as water, and making a resistivity measurement, such as with a resistivity meter that may form or be a part of the measuring device 22. Alternatively, the resistivity of a side stream of liquid may be measured using a commercially available conductivity probe, such as in an embodiment wherein the liquid resistivity is variable, or in an embodiment wherein it is not sufficiently convenient to fill the restricted area 12 completely with the liquid.

Figure 2:
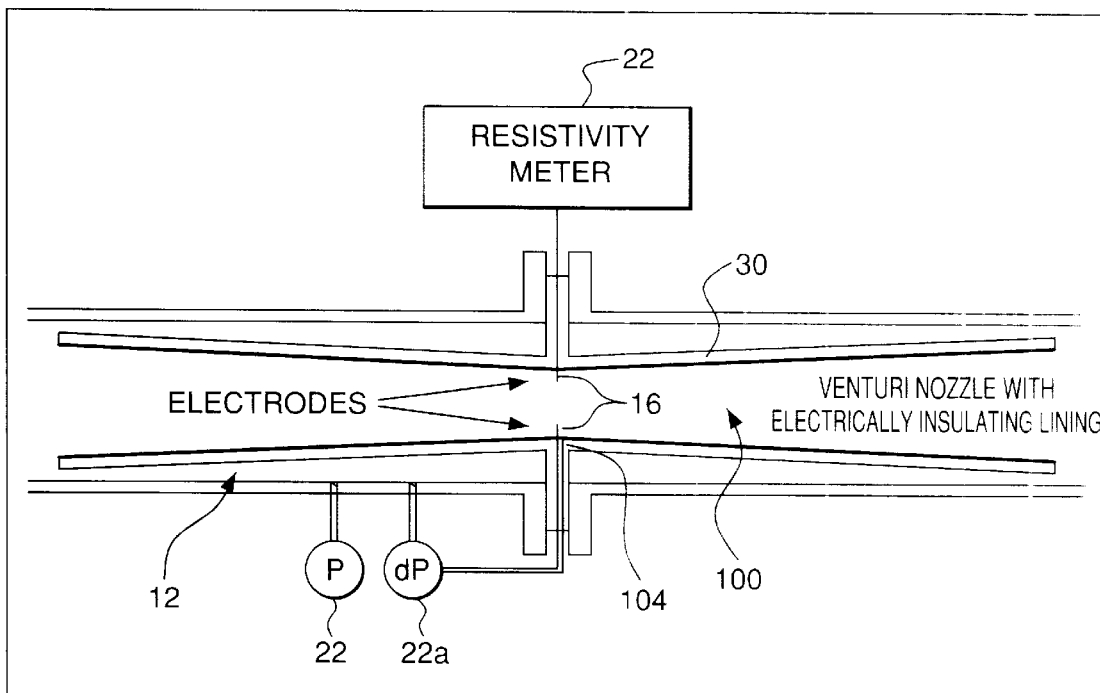
FIG. 2 is a schematic diagram illustrating a restricted area resistivity measurement system using a venturi nozzle.

FIG. 2 is a schematic diagram illustrating an embodiment of the invention of FIG. 1, wherein the electrodes 16, 18 are present within a nozzle 100, such as a venturi nozzle. A venturi nozzle 100 is known in the art, and, consequently, is not further discussed herein. In the illustrated embodiment of FIG. 2, the resistivity measurement is made in the throat of the nozzle 100. For example, the resistivity measurement may be made in the venturi meter 100, as shown in FIG. 2, in order to reduce liquid holdup and simultaneously measure flow rate. Liquid and vapor tend to separate and flow at different velocities, but, if flow is accelerated and/or agitated in a nozzle, such as in a venturi meter 100, the liquid and vapor mix and flow at substantially the same velocity. This mixing improves the accuracy of the liquid volume measurement by mixing and evenly dispersing the differing phases of conductivity at the point where the conductivity measurement is made.

The mixing allows the flow rate to be determined using the nozzle 100, such as by performing a pressure measurement within the pipeline, and measuring differential pressure between the pipeline and the throat of the nozzle 100, such as the venturi nozzle. For example, a pressure transmitter 102 may be placed in the pipeline 12 to measure the pressure therein, and a second pressure transmitter 104 may measure pressure within the nozzle 100. A differential pressure meter 22a may then be used to measure the pressure differential between the restricted area 12 and the nozzle 100, allowing the flow to be calculated therefrom, using, for example, the James method of flow rate calculation taught in "Metering of Steam-Water Two Phase Flow by Sharp-Edged Orifices", by Russell James, Proc. Inst. Mech. Engrs., 1962, Clowes and Sons, Ltd., London. Alternative multi-phase flow nozzle correlation methodologies will be apparent to those skilled in the art. The pressure meter 22, 22a may be any type of calculation meter, as will be apparent to those skilled in the art, and may be included in, or may include, the resistivity meter and/or enthalpy meter as a master measuring device 22.

In an embodiment of the present invention, the resistivity measurement is preferably made within a length of insulated restricted area 12 sufficient to prevent current flow through the walls 30 of the restricted area 12, for reasons discussed hereinabove. The venturi nozzle 100, for example, allows for the prevention of undesired current flow, due to the fact that a venturi nozzle 100 provides a sufficient length to maintain the current entirely within the fluid.

Additionally, a nozzle 100, such as a venturi nozzle, may facilitate the measurement of enthalpy by the agitating and mixing of the liquid and vapor phases of the multi-phase system, because this mixing facilitates measurement of volume fractions. The quantity of steam mass fraction (X) is related to liquid volume fraction by the density of the liquid ($D_L$) and the density of the steam ($D_S$) Densities may be determined from a steam table and the pressure as measured in the restricted area 12, the quantity $V_L$ is preferably determined using the resistivity measures and Equation 1 or 1a, and steam mass fraction (X) may then be calculated using Equation 2:

$$X = \frac{(1-V_L)D_S}{(1-V_L)D_S + V_L D_L}. \quad (2)$$

It will be apparent to those skilled in the art that Equations 1, 1a and 2 are applicable to multi-phase mixtures other than steam-water, wherein the phase resistivities and densities of these other multi-phase mixtures are substituted for the steam-water measures. For example, oil and gas, like steam, are substantially non-conductive, and may be combined with more conductive elements in a mixture form. The present invention is also applicable to these other multi-phase mixtures.

The enthalpy of a water and steam mixture may be calculated based upon the liquid volume fraction and pressure. This calculation may be carried out using at least one processor 22, which processor(s) will be apparent to those skilled in the art, and include, but are not limited to, a manual calculation, and an automated analog or digital processor. The processor or processors preferably perform mathematical operations as in Equation 2 hereinabove, Equation 3 hereinbelow, and may additionally calculate resistivity with respect to Equation 1 or 1a hereinabove. The processor or processors may additionally serve as storage devices for the densities used in Equation 2, and/or for the pressure measurements taken in the present invention, and may be included in, or separate from, the measurement device or devices 22. The enthalpy of the steam-water mixture (h) is related to the enthalpy of the liquid ($h_L$), and the enthalpy of the steam ($h_S$), by the mass fraction discussed hereinabove, according to Equation 3 hereinbelow, wherein the enthalpies may be determined from a steam table, and wherein the pressure used to determine the enthalpy of each phase is preferably measured in the restricted area as discussed hereinabove:

$$h=(1-X)h_L+Xh_S \quad (3)$$

Equation 3 thus yields the enthalpy of the multi-phase system, and Equation 3 may be calculated by an enthalpy meter, which may include at least one of the at least one processors 22 and/or meters 22 discussed hereinabove.

A continuous phase fraction measurement, as described hereinabove, provides for the continuous, real-time measurement of enthalpy and flow rate. For example, this continuous phase fraction measurement allows for measurement of the quality and mass rate of a multi-phase flow, such as a steam-water flow, and multi-phase enthalpy of a multi-phase flow, using a venturi-resistivity meter. Further, continuous phase fraction measurement allows, for example, the enthalpy of production from geothermal wells, or the enthalpy of steam injection into oil fields, to be measured. The oil-water or gas-water ratio of production from an oil or a gas well may also be measured using the present invention. Additionally, the meter of the present invention may be employed in a nuclear plant to measure the flow rates of steam and water from the reactor during upset conditions. This use of the meter of the present invention addresses an important safety concern in light of the fact that the enthalpy of the flow indicates the amount of heat being removed from the core. Currently, complex gamma ray density measurements are used for the measurement of these quantities of interest in a nuclear plant. However, the meter of the present invention provides a more simple, rugged, and cost effective solution.

Those of ordinary skill in the art will recognize that many modifications and variations of the present invention may be implemented. The foregoing description and the following claims are intended to cover all such modifications and variations.

What is claimed is:

1. A measurement device for measuring enthalpy and flow rate of a multi-phase mixture in a restricted area, comprising:

two current electrodes within a nozzle within the restricted area, wherein a first electrical current is excited within the nozzle between said two current electrodes;

at least two voltage electrodes within the nozzle within said restricted area, wherein a voltage is present between at least two of said at least two voltage electrodes, and wherein the voltage is produced by the first electrical current; and at least one measurement meter;

wherein the enthalpy of the multi-phase mixture is determined by said at least one measurement meter in accordance with a resistivity as measured by said at least one measurement meter, wherein the resistivity is generated by the at least one voltage and the first electrical current in the restricted area; and wherein a flow rate of the multi-phase mixture through the restricted area is determined by said at least one measurement meter in accordance with a differential pressure as measured by said at least one measurement meter, wherein the differential pressure is comparatively generated between the restricted area without the nozzle and within the nozzle.

2. The measurement device of claim 1, wherein said at least one measurement meter comprises a resistivity meter, wherein the resistivity is calculated using said resistivity meter.

3. The measurement device of claim 1, wherein the resistivity is used to calculate a mixing ratio between at least two phases of the multi-phase mixture.

4. The measurement device of claim 3, wherein the resistivity is used to calculate a volume fraction between at least two phases of the multi-phase mixture.

5. The measurement device of claim 1, wherein the current electrodes are located on opposing points within the nozzle.

6. The measurement device of claim 5, wherein said at least two voltage electrodes comprise two voltage electrodes, and wherein said two voltage electrodes are located between said current electrodes within the nozzle.

7. The measurement device of claim 1, wherein said at least one measurement meter comprises at least one pressure meter within the restricted area, wherein said at least one pressure meter generates the differential pressure.

8. The measurement device of claim 7, wherein said at least one pressure meter comprises:

a differential pressure meter;

wherein said differential pressure meter comprises at least two pressure meters, and wherein a first of said at least two pressure meters is located within said restricted area without the nozzle, and wherein a second of said at least two pressure meters is located within said restricted area within the nozzle, and wherein said differential pressure meter measures a pressure differential between a first pressure in said restricted area without the nozzle and a second pressure in within the nozzle.

9. The measurement device of claim 8, wherein the flow rate is calculated using said differential pressure meter based on the James method.

10. The measurement device of one of claims 2, 3, 4, or 9, further comprising at least one processor, wherein the calculations are performed by said at least one processor.

11. The measurement device of claim 10, wherein said at least one processor comprises at least one digital signal processor.

12. The measurement device of one of claim 1, wherein said at least one measurement meter comprises at least one processor, wherein said at least one processor generates the multi-phase enthalpy according to the resistivity and the differential pressure, and generates the flow rate according to the differential pressure.

13. The measurement device of claim 12, wherein the multi-phase enthalpy is generated in accordance with a first enthalpy of one phase of the multi-phase mixture, and in accordance with a second enthalpy of the second phase of the multi-phase mixture, and wherein the first enthalpy and the second enthalpy are generated from a table accessed by said at least one processor, and wherein the first enthalpy and the second enthalpy are generated from the table in accordance with the differential pressure.

14. A measurement device for measuring at least one characteristic of a multi-phase mixture in a restricted area, comprising:

two current electrodes within the restricted area, wherein a first electrical current is excited within the restricted area between said two current electrodes;

at least two voltage electrodes within said restricted area, wherein a voltage is present between at least two of said at least two voltage electrodes, and wherein the voltage is produced by the first electrical current; and at least one measurement meter, wherein a multi-phase characteristic of the multi-phase mixture is determined by said at least one measurement meter in accordance with at least one of a resistivity generated by the at least one voltage and the first electrical current in the restricted area, and a flow of the multi-phase mixture through the restricted area.

15. The measurement device of claim 14, wherein said at least one measurement meter comprises a resistivity meter, wherein the resistivity is determined using said resistivity meter.

16. The measurement device of claim 14, wherein the resistivity is used to calculate a mixing ratio between at least two phases of the multi-phase mixture.

17. The measurement device of claim 16, wherein the resistivity is used to calculate a volume fractions between at least two phases of the multi-phase mixture.

18. The measurement device of claim 14, wherein the current electrodes are located on opposing points within the restricted area.

19. The measurement device of claim 18, wherein said at least two voltage electrodes comprise two voltage electrodes, and wherein said two voltage electrodes are located between said current electrodes within the restricted area.

20. The measurement device of claim 14, wherein at least one of said current electrodes is embedded within an interior wall of the restricted area.

21. The measurement device of claim 14, wherein at least one of said current electrodes is partially exposed within the restricted area and extends within the restricted area from an interior wall of the restricted area.

22. The measurement device of claim 14, wherein at least one of said current electrodes is completely exposed within the restricted area and extends within the restricted area from an interior wall of the restricted area.

23. The measurement device of claim 14, wherein at least one of said at least two voltage electrodes is embedded within an interior wall of the restricted area.

24. The measurement device of claim 14, wherein at least one of said at least two voltage electrodes is partially exposed within the restricted area and extends within the restricted area from an interior wall of the restricted area.

25. The measurement device of claim 14, wherein at least one of said at least two voltage electrodes is completely exposed within the restricted area and extends within the restricted area from an interior wall of the restricted area.

26. The measurement device of claim 14, further comprising a resistivity measurement calibrator.

27. The measurement device of claim 14, wherein said at least one measurement meter comprises at least one pressure meter within the restricted area, wherein said at least one pressure meter generates a pressure measure, and wherein the multi-phase characteristic comprises a multi-phase enthalpy, and wherein the multi-phase enthalpy is determined according to the pressure measure generated in said at least one pressure meter and according to the resistivity.

28. The measurement device of claim 27, wherein said at least one pressure meter comprises:

a differential pressure meter;

wherein said differential pressure meter comprises at least two pressure meters, and wherein a first of said at least two pressure meters is located within a first portion of the restricted area, and wherein a second of said at least two pressure meters is located within a second portion of the restricted area, and wherein said differential pressure meter measures a pressure differential between a first pressure in the first portion and a second pressure in the second portion.

29. The measurement device of claim 28, wherein a flow rate in the restricted area is calculated using the pressure differential from said differential pressure meter.

30. The measurement device of claim 28, wherein the flow rate is calculated using said differential pressure meter using the James method.

31. The measurement device of claim 14, wherein one phase of the multi-phase mixture comprises steam.

32. The measurement device of claim 14, wherein one phase of the multi-phase mixture comprises oil.

33. The measurement device of claim 14, wherein one phase of the multi-phase mixture comprises water.

34. The measurement device of claim 14, wherein one phase of the multi-phase mixture comprises a gas.

35. The measurement device of claim 14, wherein one phase of the multi-phase mixture is substantially non-conductive.

36. The measurement device of claim 14, further comprising at least one processor.

37. The measurement device of claim 36, wherein said at least one processor comprises at least one digital signal processor.

38. The measurement device of claim 36, wherein said at least one processor generates a volume fraction measure of a volume fraction of at least two elements of the multi-phase mixture.

39. The measurement device of claim 36, wherein said at least one processor generates a mass fraction measure of a mass fraction of at least two elements of the multi-phase mixture.

40. The measurement device of one of claim 36, 37, 38 or 39, wherein said at least one processor generates the multi-phase characteristics of multi-phase enthalpy and multi-phase flow rate according to said at least one measurement meter.

41. The measurement device of claim 40, wherein the multi-phase enthalpy is generated in accordance with a first enthalpy of one phase of the multi-phase mixture, and in accordance with a second enthalpy of the second phase of the multi-phase mixture, and wherein the first enthalpy and the second enthalpy are generated from a table accessed by said at least one processor, and wherein the first enthalpy and the second enthalpy are generated from the table in accordance with a measure of pressure in the restricted area.

42. A measurement system for measuring enthalpy and flow rate of a multi-phase mixture in a restricted area, comprising:
    a restricted area comprising a nozzle portion and a pipeline portion;
    two current electrodes within the nozzle portion, wherein a first electrical current is excited within the nozzle portion between said two current electrodes;
    at least two voltage electrodes within the nozzle portion, wherein a voltage is present between at least two of said at least two voltage electrodes, and wherein the voltage is produced by the current; and
    at least one measuring device;
    wherein the enthalpy of the multi-phase mixture is determined by said at least one measuring device in accordance with a resistivity as measured by said at least one measuring device, wherein the resistivity is generated by the at least one voltage and the first electrical current in the nozzle portion; and
    wherein a flow rate of the multi-phase mixture through said restricted area is determined by said at least one measuring device in accordance with a differential pressure as measured by said at least one measuring device, wherein the differential pressure is comparatively generated between the pipeline portion and the nozzle portion.

43. The measurement system of claim 42, wherein said at least one measuring device comprises:
    a resistivity meter that measures the resistivity of the multi-phase mixture; and
    at least one differential pressure meter, wherein said at least one differential pressure meter measures the differential pressure.

44. The measurement system of claim 43, wherein the nozzle portion comprises a venturi nozzle.

45. The measurement system of claim 43, wherein said at least one differential pressure meter comprises at least two pressure meters, and wherein a first of said at least two pressure meters is located within the nozzle portion, and wherein a second of said at least two pressure meters is located within the pipeline portion, wherein said measuring device measures a pressure differential between a first pressure in the nozzle portion and a second pressure in the pipeline portion.

46. The measurement system of claim 42, wherein the flow rate is calculated using said at least one measuring device according to the James method.

47. The measurement system of claim 42, wherein said at least one measuring device further comprises at least one processor, and wherein said at least one processor generates an output of the resistivity and the differential pressure.

48. The measurement system of claim 47, wherein said at least one processor calculates a mixing ratio between at least two elements of the multi-phase mixture according to the resistivity.

49. The measurement system of claim 47, wherein said at least one processor calculates a volume fraction between at least two elements of the multi-phase mixture according to the resistivity.

50. The measurement system of claim 47, wherein said at least one processor comprises a memory including therein a plurality of enthalpies list, wherein the list includes an enthalpy item for each phase of the multi-phase mixture, and wherein at least one of the plurality of enthalpy items for each phase is corresponded to the differential pressure generated by the at least one measuring device.

51. The measurement system of claim 50, wherein said memory further includes at least a density and a resistivity item for each phase of the multi-phase mixture.

52. The measurement system of claim 47, wherein the multi-phase enthalpy is generated according to a first enthalpy of one phase of the multi-phase mixture, and according to a second enthalpy of a second phase of the multi-phase mixture, and wherein the first enthalpy and the second enthalpy are generated from a table accessed by said at least one processor, and wherein the first enthalpy and the second enthalpy are generated from the table in accordance with the differential pressure.

53. The measurement system of claim 42, wherein said current electrodes are located on opposing points on an interior wall of said restricted area.

54. The measurement system of claim 53, wherein said at least two voltage electrodes comprises two voltage electrodes, and wherein said two voltage electrodes are located on the interior wall between said current electrodes.

55. The measurement system of claim 42, wherein said restricted area comprises an insulated interior.

56. A measurement system for measuring at least one characteristic of a multi-phase mixture in a restricted area, comprising:
    a restricted area;
    two current electrodes within said restricted area, wherein a first electrical current is excited within said restricted area between said two current electrodes;

at least two voltage electrodes within said restricted area, wherein a voltage is measured between at least two of said at least two voltage electrodes, and wherein the voltage is produced by the current; and at least one measuring device, wherein at least one multi-phase characteristic of the multi-phase mixture is determined using said at least one measuring device in accordance with a resistivity generated by the at least one voltage and the first electrical current.

57. The measurement system of claim 56, wherein said at least one measuring device comprises:

a resistivity meter that measures the resistivity of the multi-phase mixture; and at least one pressure meter, wherein said at least one pressure meter measures pressure in at least one portion of said restricted area.

58. The measurement system of claim 57, wherein said restricted area comprises a first portion and a second portion.

59. The measurement system of claim 58, wherein the first portion of said restricted area comprises a pipeline.

60. The measurement system of claim 59, wherein the second portion of said restricted area comprises a nozzle.

61. The measurement system of claim 60, wherein the nozzle comprises a venturi nozzle.

62. The measurement system of claim 60, wherein the resistivity is measured in the nozzle.

63. The measurement system of claim 60, wherein said at least one pressure meter comprises at least two pressure meters, and wherein a first of said at least two pressure meters is located within the first portion, and wherein a second of said at least two pressure meters is located within the second portion, wherein said measuring device measures a pressure differential between a first pressure in the first portion and a second pressure in the second portion.

64. The measurement system of claim 63, wherein a flow rate is calculated using said at least one measuring device according to the pressure differential.

65. The measurement system of claim 63, wherein a flow rate is calculated using said at least one measuring device according to the James method.

66. The measurement system of claim 57, wherein said resistivity meter is calibrated.

67. The measurement system of claim 57, wherein said at least one pressure meter comprises a differential pressure meter.

68. The measurement system of claim 67, wherein the characteristic comprises a flow rate of the multi-phase mixture, and wherein the flow rate in said restricted area is measured by said differential pressure meter.

69. The measurement system of claim 68, wherein the characteristic further comprises a multi-phase enthalpy of the multi-phase mixture, and wherein the multi-phase enthalpy in the restricted area is measured according to the resistivity.

70. The measurement system of claim 69, wherein said measuring device further comprises at least one processor, and wherein said at least one processor generates an output of the resistivity and the differential pressure.

71. The measurement system of claim 70, wherein said at least one processor calculates a mixing-ratio of at least two elements of the multi-phase mixture according to the resistivity.

72. The measurement system of claim 70, wherein said at least one processor calculates volume fractions of at least two elements of the multi-phase mixture according to the resistivity.

73. The measurement system of claim 70, wherein said at least one processor comprises a memory including therein a plurality of enthalpies list, wherein the list includes an enthalpy item for each phase of the multi-phase mixture, and wherein at least one of the plurality of enthalpy items for each phase is corresponded to the differential pressure generated by the at least one pressure meter.

74. The measurement system of claim 73, wherein said memory further includes at least a density and a resistivity item for each phase of the multi-phase mixture.

75. The measurement system of claim 56, wherein said current electrodes are located on opposing points on an interior wall of said restricted area.

76. The measurement system of claim 75, wherein said at least two voltage electrodes comprises two voltage electrodes, and wherein said two voltage electrodes are located on the interior wall between said current electrodes.

77. The measurement system of claim 56, wherein at least one of said current electrodes is embedded within a wall of said restricted area.

78. The measurement system of claim 56, wherein at least one of said at least two voltage electrodes is embedded within a wall of said restricted area.

79. The measurement system of claim 56, wherein said restricted area comprises an insulated interior.

80. The measurement system of claim 56, wherein one phase of the multi-phase mixture comprises steam.

81. The measurement system of claim 56, wherein one phase of the multi-phase mixture comprises oil.

82. The measurement system of claim 56, wherein one phase of the multi-phase mixture comprises water.

83. The measurement system of claim 56, wherein one phase of the multi-phase mixture comprises a gas.

84. The measurement system of claim 56, wherein at least one phase of the multi-phase mixture is substantially non-conductive.

85. The measurement system of claim 56, wherein said measuring device comprises at least one digital processor, wherein said at least one digital processor calculates the at least one characteristic of the multi-phase mixture according to the resistivity.

86. The measurement system of claim 85, wherein said at least one digital processor generates a volume fraction between at least two elements of the multi-phase mixture.

87. The measurement system of claim 85, wherein said at least one digital processor generates a mass fraction between at least two elements of the multi-phase mixture.

88. The measurement system of claim 85, wherein the at least one characteristic comprises a multi-phase enthalpy, and wherein the multi-phase enthalpy is generated according to a first enthalpy of one phase of the multi-phase mixture, and according to a second enthalpy of a second phase of the multi-phase mixture, and wherein the first enthalpy and the second enthalpy are generated from a table accessed by said at least one digital processor, and wherein the first enthalpy and the second enthalpy are generated from the table in accordance with a measure of pressure by said measuring device.

89. A measurement system for simultaneously measuring enthalpy and flow rate of a multi-phase mixture, continuously, in a restricted area, comprising:

a restricted area comprising a nozzle portion and a pipeline portion;

two current electrodes within the nozzle portion, wherein a first electrical current is excited within the nozzle portion between said two current electrodes;

at least two voltage electrodes within the nozzle portion, wherein a voltage is present between at least two of said at least two voltage electrodes, and wherein the voltage is produced by the current; and at least one measuring device;

wherein the enthalpy of the multi-phase mixture is determined by said at least one measuring device from a resistivity as-measured by said at least one measuring device, wherein the resistivity is generated by the at least one voltage and the first electrical current in the nozzle portion, and from a differential pressure measured by said at least one measuring device, and from a steam table; and wherein a flow rate of the multi-phase mixture through said restricted area is determined by said at least one measuring device from the differential pressure as measured by said at least one measuring device, wherein the differential pressure is comparatively generated between the pipeline portion and the nozzle portion.

90. A method of measuring at least one characteristic of a multi-phase mixture in a restricted area, comprising:

exciting a first electrical current between two current electrodes within the restricted area;

measuring a voltage between at least two voltage electrodes within the restricted area, wherein the voltage is produced by the current; and measuring a multi-phase characteristic of the multi-phase mixture according to a resistivity measure generated by the voltage and the current, and according to a flow of the multi-phase mixture.

91. The method of claim 90, further comprising:

measuring the resistivity of the multi-phase mixture; and measuring at least one pressure in at least one portion of the restricted area.

92. The method of claim 91, wherein said measuring the resistivity comprises measuring the resistivity in a nozzle portion of the restricted area.

93. The method of claim 91, wherein said measuring at least one pressure comprises measuring a pressure differential between a first pressure in a first portion of the restricted area and a second pressure in a second portion of the restricted area.

94. The method of claim 93, wherein the first portion comprises a nozzle.

95. The method of claim 93, further comprising calculating a flow rate according to the pressure differential.

96. The method of claim 93, further comprising calculating a flow rate according to the James method.

97. The method of claim 91, further comprising calibrating said measuring of the resistivity.

98. The method of claim 97, wherein said calibrating comprises filling the restricted area with a liquid having known resistivity, and, after said filling, taking a resistivity measurement of the liquid having the known resistivity.

99. The method of claim 91, further comprising calculating a flow rate in the restricted area using a differential pressure meter.

100. The method of claim 91, further comprising calculating a mixing ratio between at least two elements of the multi-phase mixture according to the resistivity.

101. The method of claim 91, further comprising calculating volume fraction between at least two elements of the multi-phase mixture according to the resistivity.

102. The method of claim 91, wherein said measuring of the at least one multi-phase characteristic comprises:

accessing a table of a plurality of enthalpies;

generating a first enthalpy of one phase of the multi-phase mixture and a second enthalpy of a second phase of the multi-phase mixture from the table in accordance with said measuring of pressure; and generating a multi-phase enthalpy according to the first enthalpy and according to the second enthalpy.

103. A method of measuring enthalpy and flow rate of a two-phase mixture in a restricted area, comprising:

exciting a first electrical current between two current electrodes within the restricted area;

measuring a voltage between at least two voltage electrodes within the restricted area, wherein the voltage is produced by the current;

generating a resistivity from the voltage and the current;

calculating a liquid volume fraction between phases of the two-phase mixture from the resistivity of the two-phase mixture, and from a liquid resistivity of a liquid phase of the two-phase mixture;

measuring a differential pressure in the restricted area between a first pressure in a nozzle portion of the restricted area and a pipeline portion of the restricted area;

calculating a mass fraction between phases of the two-phase mixture from the liquid volume fraction, the differential pressure, and a steam table;

generating a first enthalpy of one phase of the two-phase mixture, and a second enthalpy of the other phase of the two-phase mixture; and calculating a two-phase mixture enthalpy from the first enthalpy, the second enthalpy, and the mass fraction.

* * * * *